March 24, 1970      F. C. BEEBE      3,502,827
APPARATUS FOR DETECTING FOREIGN OBJECTS IN OR ON MOVING SHEETS
Filed Aug. 2, 1968      2 Sheets-Sheet 1
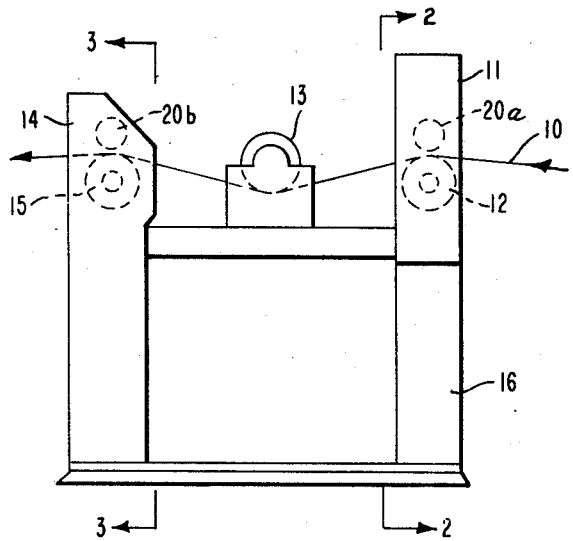
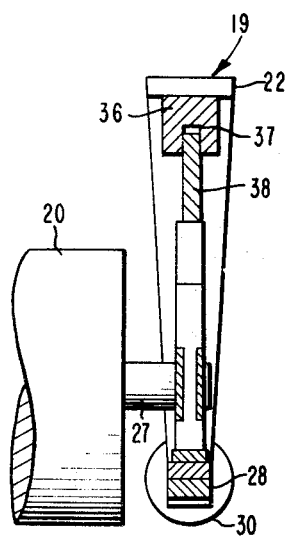
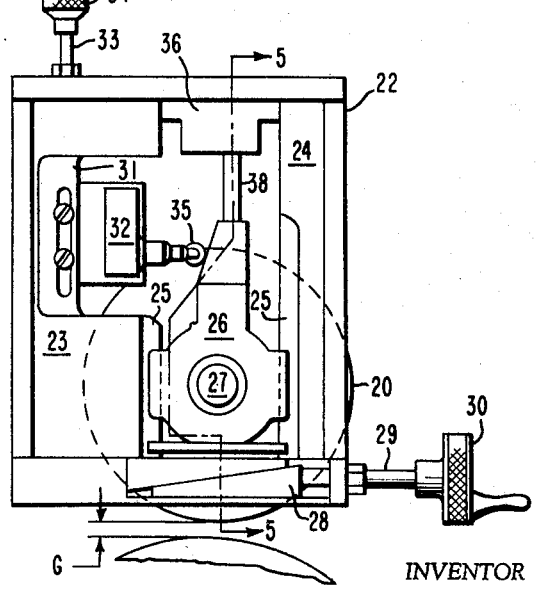
INVENTOR
FRANKLYN C. BEEBE
BY
ATTORNEY

INVENTOR
FRANKLYN C. BEEBE

United States Patent Office 3,502,827
Patented Mar. 24, 1970

3,502,827
APPARATUS FOR DETECTING FOREIGN OBJECTS IN OR ON MOVING SHEETS
Franklyn C. Beebe, Wilmington, Del., assignor to E. I. du Pont de Nemours and Company, Wilmington, Del., a corporation of Delaware
Filed Aug. 2, 1968, Ser. No. 749,812
Int. Cl. B65h 25/14
U.S. Cl. 200—61.13                5 Claims

ABSTRACT OF THE DISCLOSURE

Apparatus for detecting foreign objects in or on wide moving sheets is disclosed. Two or more sheet-supporting rolls extend across the width of the sheet, a plurality of lightweight detecting rolls are positioned above the sheet-supporting rolls such that the nip between each detecting roll and its associated sheet-supporting roll is greater than the thickness of the sheet. A foreign object on the sheet will cause one or more of the detecting rolls to move upward and thereby actuate an electrical switch.

Background of the invention

In the production or treatment of continuous sheet materials it is common for the sheet to be conveyed in opened, substantially horizontal fashion over rather sizeable distances. Many types of foreign objects can accidentally fall on the moving sheet, including tools, separated parts of apparatus, and lumps of accumulated product-debris. Accidental multiple-layer folds in the sheet are also considered foreign objects herein. Particularly in the production of non-woven sheets, but also for more conventional fabrics and films, a calendering operation is often required. Calender rolls are usually massive and mirror-finished; and, especially for those adapted to calendering wide sheets, are very expensive. Passage of a single relatively incompressible foreign object appreciably thicker than the sheet usually ruins at least one calender roll. Analogously, the presence of thick foreign objects in or on a sheet being unwound and fed, for example, to printing rolls can damage the surfaces of these rolls.

Many types of apparatus are known for monitoring sheet thickness or for detecting certain types of foreign objects. Nearly all of these are designed to bear against opposite surfaces of a sheet being conveyed, one or both of the opposite contacting apparatus parts exerting drag on the sheet. Frequently non-woven sheets are either too weak to withstand this drag or their surfaces are deleteriously distorted. Moreover, these known devices ordinarily rely on complicated transducer assemblies, dielectric constant variation, ferromagnetism, electric conductivity, changes in electrical reactance of a circuit, or the like for detecting or measuring increases in thickness. The complex electronics involved renders these devices rather expensive. One such device is described by Urmenyi in U.S. Patent No. 3,348,313, issued October 24, 1967, and another by Scharf in U.S. Patent No. 3,363,-458, issued January 16, 1968. In these devices, a plurality of feeler members are overlapping and contact the sheet over its whole width across a single datum surface. It is apparent that a sharp change in sheet direction must occur on passing around the datum surface and that means are provided to urge the feeler members into engagement with the sheet.

Statement of the invention

This invention provides an apparatus for the detection of foreign objects in or on a wide sheet being conveyed in substantially horizontal fashion, said foreign objects being thicker than the sheet by a predetermined amount. It further provides for detecting foreign objects without drag on, contact with, or distortion of the sheet surfaces during normal operation. A still further provision is an inexpensive and simply constructed apparatus for protecting subsequent fixed-nip devices from the damaging effect of foreign objects. Further provisions of this invention will become apparent hereinafter.

The apparatus of this invention comprises:

(1) A rigid frame for supporting working parts;

(2) At least two horizontal sheet-supporting rolls with substantially parallel and horizontally separated axes of rotation defining invariant vertical reference levels with respect to said frame, each roll extending transversely across at least the sheet-conveying width of the apparatus;

(3) Means for rotating said sheet-supporting rolls at a peripheral velocity substantially identical to the linear sheet-conveying velocity;

(4) Means urging said sheet against said sheet-supporting rolls at least along lines of contact corresponding to the top of each supporting roll;

(5) A plurality of lightweight, cylindrical, detecting rolls with axes substantially parallel to and vertically positioned above the topmost reference levels of corresponding sheet-supporting rolls, each detecting roll extending transversely across only a fraction of the length of its associated sheet-supporting roll and separated from each transversely adjacent detecting roll, the plurality of detecting rolls having transverse locations staggered above the sheet-supporting rolls so that every position of conveyed sheet can pass beneath at least one detecting roll;

(6) A plurality of pairs of brackets fixedly fastened to the frame and supporting each detecting roll at the ends of its axis, each bracket comprising:

(a) a journal for free-rotation of the detecting roll, (b) means to readily allow upward displacement of each journal, (c) means for adjusting the lowermost journal height to create a predetermined minimum nip between each detecting roll and the topmost reference level of its associated sheet-supporting roll, said minimum nip being larger than the thickness of sheet to be conveyed, and (d) an electrical switch positioned to be actuated when said minimum nip increases by a predetermined amount.

Brief description of the drawings

FIGURE 1 shows a view in elevation of the side of a typical apparatus of this invention.

FIGURE 4 shows the mechanism within each mounting bracket.

FIGURE 5 is a cross-section taken at 5—5 of FIGURE 4.

Detailed description

The figures all apply to a single preferred form of the inventive apparatus, and corresponding parts are identically numbered throughout. In FIGURE 1 a sheet 10, e.g., a lightly consolidated web of randomly deposited plexi-filamentary material as described by Steuber in U.S. Patent No. 3,169,899 is being forwarded from right to left as indicated by arrows. Although sheet 10 can be unwound from a roll, it is preferably fed to the apparatus shown directly from web-laydown apparatus (not shown). Sheet 10 passes from the apparatus of FIGURE 1 to a calender (not shown) and to a wind-up roll (not shown). Sheet 10 of 12 foot (3.7 meter) widths, or even greater, are conveyed in this way. A considerable length of opened and substantially horizontal travel precedes entry to the nip of the calender; therefore the possibility exists for accidental accumulation on or in sheet 10 of foreign objects capable of damaging calender rolls. The apparatus shown in the figures serves to protect the expensive calender rolls (not shown).

Figure 2:
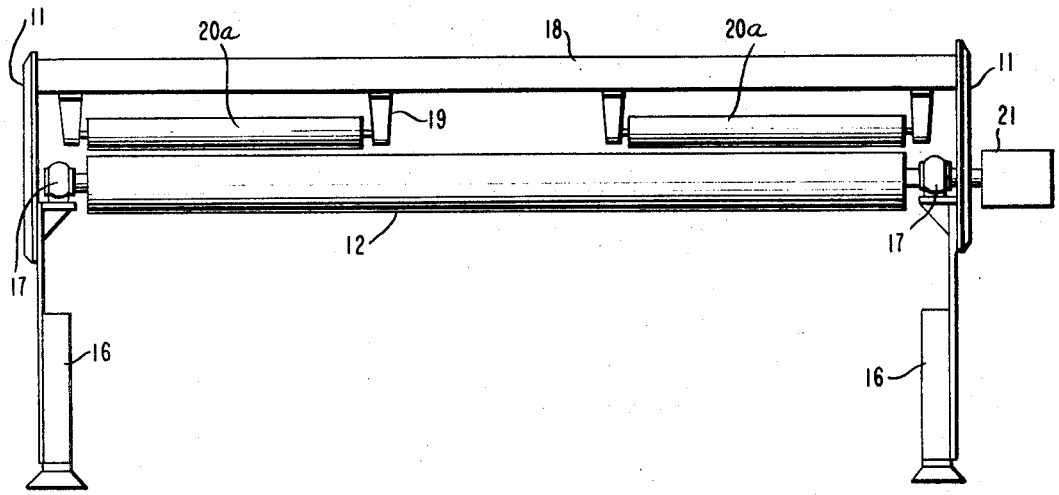
FIGURE 2 is a transverse view in elevation of the apparatus taken as indicated at 2—2 of FIGURE 1.
Figure 3:
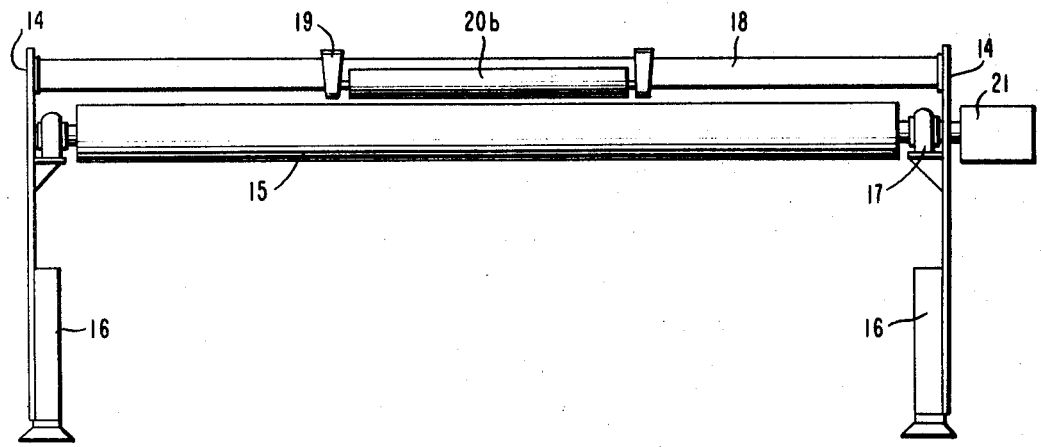
FIGURE 3 is similar to FIGURE 2 but taken at 3—3 of FIGURE 1.

Referring to FIGURES 1, 2, and 3, the rigid frame of this apparatus comprises two pairs of floor-mounted pedestals 16 to which the pair of end-plates 11 are attached at the first roll-stand position and the pair of end-plates 14 at the second roll-stand position. A rigid horizontal beam 18 extends between the pairs of end-plates at each of the two roll-stand positions.

In being conveyed through the apparatus of this invention, sheet 10 contacts sheet-supporting rolls 12 and 15 at their tops and passes beneath similar roll 13 which gives a slight M-shape (FIGURE 1) to the path followed by sheet 10 and urges it against sheet-supporting rolls 12 and 15 at least along lines of contact (reference levels) at their tops. Rolls 12, 13, and 15 are driven at a peripheral velocity substantially identical to the linear velocity of sheet 10, thus avoiding surface drag. Motor means 21 to provide this rotation are of any conventional speed-controlled type. Fixed but ordinarily adjustable bearings 17 support and allow rotation 12, 13, and 15 about their transverse axes.

Rolls 12, 13, and 15 in the preferred embodiment shown are 146 inches (3.71 meters) long. To prevent sag over such a long end-supported reach, these rolls are massive and heavy, being 10.5 inches (0.27 meter) in diameter in the preferred embodiment.

Brackets 19 support two vertically displaceable, low-mass, rotatable rolls 20a directly above sheet-supporting roll 12 of the first roll-stand (FIGURE 2). Rolls 20a are axially separated and each covers at least the outer third of the length of roll 12. Brackets 19 are fastened to the bottom of beam 18.

Analogously for the second roll-stand (FIGURE 3), brackets 19 affixed to a vertical surface of beam 18 support a single vertically displaceable, low-mass, rotatable roll 20b directly above sheet-supporting roll 15. Roll 20b covers at least the central third of the length of roll 15. Thus, all portions of sheet 10 being conveyed through the apparatus pass beneath at least one of rolls 20.

Rolls 20 are supported by brackets 19 so that, when drawn by gravity to their lowermost positions, the gaps between rolls 12 and 20a and between rolls 15 and 20b are greater by a preselected increment than the thickness of sheet 10. Rolls 20 neither contact sheet 10 nor rotate unless a foreign object thick enough to contact a roll 20 passes through the nip. In order to prevent tearing of sheet 10 and consequent interruption of sheet-transport, rolls 20 are made of the lowest mass possible so as to be readily displaced vertically and readily rotatable. Ordinarily they are thin-walled hollow cylinders of a lightweight metal or other rigid material. Such low-mass rolls, when long enough to span the whole length of rolls 12 or 15, are insufficiently rigid to maintain preselected gap-widths for passage of sheet 10 and too heavy to be deflected vertically without tearing sheet 10. By making rolls 20 shorter, rigidity can be great enough to prevent sag and weight low enough for instant vertical deflection. Simultaneously, staggering a plurality of short low-mass rolls 20 along at least two roll-stand positions provides complete coverage of the width of sheet 10 being conveyed. The preferred embodiment of the figure utilizes three rolls 20, each about 50 inches (1.27 meters) long and about 6.4 inches (16.2 cm.) in diameter. It is apparent that the number and size of these rolls 20 can vary widely to suit apparatus of differing sizes and materials.

Details of suitable brackets 19 are shown in FIGURES 4 and 5 where FIGURE 5 is a cross-section as shown along the irregular section-line 5—5 of FIGURE 4. Each bracket 19 comprises a generally rectangular, open frame 22 secured to the interior of which are vertical plates 23, 24. Plates 23, 24 are horizontally spaced from one another and have vertical machined confronting edges 25 straddling which are vertical machined slots in a pillow-block 26, thus allowing pillow-block 26 to move or to be adjusted vertically. Journaled in each pillow-block 26 is a shaft 27 which supports roll 20 along its axis. Each pillow-block 26 is vertically adjustable by means of a wedge-type jack 28 located in the base of bracket 19, which jack 28 is adapted to raise or lower pillow-block 26 (and therefore roll 20) by means of screw 29 and handwheel 30. Vertical plate 23 is recessed to a machined surface 31 for receiving a sensitive switch 32 which is vertically adjustable by means of screw 33 and handwheel 34. Switch 32 is actuated by its plunger-and-wheel 35 which is urged outward by a spring (not shown) to engage a sloping cam surface on an upward extension of pillow-block 26. To prevent accidental tripping of switch 32 by vibration, it is ordinarily preferred to provide block 36 with guide-hole 37 within which a guide-pin 38 attached to pillow-block 26 can slide.

Minimum gap G (FIGURE 4) is adjusted by moving wedgejack 28 with handwheel 30 so that gap G is at least greater than thickness of sheet 10, which is ordinarily between 0.005 and 0.020 inch (0.127 and 0.458 mm.). Sensitivity of detection of foreign objects is adjusted with handwheel 30 so that switch 32 is actuated by upward movement of pillow-block 26 by a preselected increment. In one preferred embodiment for sheet 10 of about 0.015 inch (0.381 mm.) thickness, gap G is set at 0.025 inch (0.635 mm.). and switch 32 is positioned to be actuated when gap G is nicreased by 0.025 inch (0.635 mm.). Thus, if sheet 10, either because of folding or of foreign objects, instantaneously exceeds a thickness of 0.050 inch (1.270 mm.), one or more of switches 32 are actuated. In the preferred embodiment, actuation of a switch 32 sounds an alarm and causes the calender-rolls (not shown) to open. Thus, damage to calender rolls is prevented without in any way interrupting production and conveyance of sheet 10.

Bowed rolls, defining very slightly upward arching of the topmost reference levels, are sometimes used in place of rolls 12 and/or 15 for guiding sheet 10 through the apparatus without wandering. This modification of sheet-conveying rolls is well known in the art. Although the arching is normally very gradual, the nip between the top and a right-cylindrical roll positioned above a bowed roll is of necessity very non-uniform if a single right-cylindrical roll extends across the whole width of a wide sheet. By using a plurality of short cylindrical rolls 20 as in this invention, it is possible to adjust them to provide substantially uniform gap-widths opposite a bowed roll—at least to the precision required for the protection of subsequent fixed-nip calendering devices. This same kind of adjustment is apparent if compensation for possible sagging of massive sheet-supporting rolls 12 and 15 is desired.

In a still further preferred embodiment of the protective device of this invention, slitters (not shown) are mounted on the rigid frame near the sheet edges in the reaches between rolls 15 and 13 and between rolls 13 and 12 (FIGURE 1). Sheet 10 is thereby simultaneously edge-trimmed to a uniform width.

I claim:
1. An apparatus for the detecting of foreign objects in or on a wide sheet being conveyed in substantially horizontal fashion, said foreign objects being thicker than the sheet by a predetermined amount, said apparatus comprising:
 (1) a rigid frame for supporting working parts;
 (2) at least two horizontal sheet-supporting rolls with substantially parallel and horizontally separated axes of rotation defining invariant vertical reference levels with respect to said frame, each roll extending trans- versely across at least the sheet-conveying width of the apparatus;

(3) means for rotating said sheet-supporting rolls at a peripheral velocity substantially identical to the linear sheet-conveying velocity;

(4) means urging said sheet against said sheet-supporting rolls at least along lines of contact corresponding to the top of each supporting roll;

(5) a plurality of lightweight, cylindrical, detecting rolls with axes substantially parallel to and vertically positioned above the topmost reference levels of corresponding sheet-supporting rolls, each detecting roll extending transversely across only a fraction of the length of its associated sheet-supporting roll and separated from each transversely adjacent detecting roll, the plurality of detecting rolls having transverse locations staggered above the sheet-supporting rolls so that every portion of conveyed sheet can pass beneath at least one detecting roll;

(6) a plurality of pairs of brackets fixedly fastened to the frame and supporting each detecting roll at the ends of its axis, each bracket comprising:

(a) a journal for free-rotation of the detecting roll, (b) means providing upward displacement of each journal by the associated detecting roll contacting the foreign object;

(c) means for adjusting the lowermost journal height to create a predetermined minimum nip between each detecting roll and the topmost reference level of its associated sheet-supporting roll, said minimum nip being larger than the thickness of sheet to be conveyed, and (7) an electrical switch including contacts positioned in each bracket, and means causing said contacts to be actuated when said minimum nip increases by the predetermined amount.

2. Apparatus of claim 1 wherein each detecting roll is a thin-walled hollow cylinder of a lightweight rigid material.

3. Apparatus of claim 2 wherein there are at least 3 detecting rolls.

4. Apparatus of claim 3 wherein the sheet-supporting rolls are at least about 10 ft. long.

5. Apparatus of claim 4 wherein the sheet-supporting rolls are bowed slightly for guiding the sheet through the apparatus and wherein the number of detecting rolls is sufficient to provide an essentially uniform nip between each detecting rolls and its associated sheet-supporting rolls.

References Cited

UNITED STATES PATENTS

| | | | |
|---|---|---|---|
| 2,896,196 | 7/1959 | Hartford et al. | 73—159 |
| 3,145,275 | 8/1964 | Gildart | 200—61.41 |
| 3,180,143 | 4/1965 | Menary | 73—159 |
| 3,301,974 | 1/1967 | Hancock | 200—61.13 |

ROGERT K. SCHAEFER, Primary Examiner

M. GINSBURG, Assistant Examiner

U.S. Cl. X.R.

73—159; 200—61.41; 340—259